United States Patent [19]
Wettengel et al.

[11] Patent Number: 5,377,265
[45] Date of Patent: Dec. 27, 1994

[54] PARALLEL ADDITIVE SCRAMBLER AND DESCRAMBLER

[75] Inventors: Heinz Wettengel, Ditzingen; Hartmut Borschel, Stuttgart, both of Germany

[73] Assignee: Alcatel N.V., Amsterdam, Netherlands

[21] Appl. No.: 9,811

[22] Filed: Jan. 27, 1993

[30] Foreign Application Priority Data

Jan. 31, 1992 [DE] Germany ............... 4202682

[51] Int. Cl.⁵ ............................. H04K 1/02
[52] U.S. Cl. ............................ 380/9; 380/33; 380/46; 380/49; 380/50
[58] Field of Search ............ 380/9, 33, 46, 49, 50

[56] References Cited

U.S. PATENT DOCUMENTS

| | | | |
|---|---|---|---|
| 3,784,743 | 1/1974 | Schroeder | 380/46 |
| 4,172,213 | 10/1979 | Barnes et al. | 380/49 X |
| 4,890,324 | 12/1989 | Jansen | 380/46 X |
| 5,008,938 | 4/1991 | Freeburg et al. | 380/50 |
| 5,031,129 | 7/1991 | Powell et al. | 364/717 |

FOREIGN PATENT DOCUMENTS 0301383 2/1989 European Pat. Off. ....... H03K 3/84

OTHER PUBLICATIONS

Abstract of Japanese Pat. Doc. 60-217746, Oct. 31 1985.
Abstract of Japanese Pat. Doc. 2058416, Feb. 27, 1990.
Abstract of Japanese patent Document 59-138138, Aug. 8 1984.
Abstract of Japanese Patent Document 2277329. Nov. 13 1990.
Proc. IEE, vol. 111, No. 11, Nov. 1964, pp. 1803 to 1806 by S. H. Taso, "Generation of delayed replicas of maximal-length linear binary sequences".
Siemens Research and Development, vol. 3 (1974) No. 4, pp. 218 to 224, "Erzeugung von binaren Quasi-Zufallsfolgen hoher Taktirequenz durch Multiplexen" (with English language Abstract of Introduction. K. Mohrmann).
Elektronik 26/30.12.1983, pp. 67 to 70, entitled "Parallel arbeitende Scrambler, Descrambler und Zufallsfolgen-Generatoren" with English translation of the Abstract.

Primary Examiner—Bernarr E. Gregory
Attorney, Agent, or Firm—Ware, Fressola, Van Sluys & Adolphson

[57] ABSTRACT

Parallel working additive scramblers produce a predetermined pseudorandom sequence of length L in a word generator, which consists of an N-stage shift register. To obtain more than N parallel located pseudorandom sequences, the word generator is connected to a network in which, in addition to the pseudorandom sequences created by modulo-2 addition, other pseudorandom sequences are created with a different phase relation. Performing the linkage operations limits the maximum bit rate sequence that can be transmitted. The entire pseudorandom sequence is stored in a memory (S). The desired pseudorandom sequence is produced in a circular storage (RS) by means of shifting operations. The circular storage (RS) is in the form of a feedback shift register (SR) and is used as the memory (S), in which each of the outputs is connected to an input of an EXOR-gate, in which a pseudorandom sequence is modulo-2 added with a partial stream of a parallelized serial data stream. The partial streams are subsequently converted to parallel-serial form in a multiplexer. Data streams with a higher bit rate sequence are possible.

19 Claims, 2 Drawing Sheets

PARALLEL ADDITIVE SCRAMBLER AND DESCRAMBLER

TECHNICAL FIELD

The invention concerns a parallel additive scrambler for scrambling a serial data stream into parallel m-bit words and a descrambler for descrambling parallel m-bit words into a serial data stream.

BACKGROUND OF THE INVENTION

A scrambler is known from the CCITT recommendation G.709 number 2.4 and FIG. 2.10, which is able to scramble data streams that must be scrambled in a pseudorandom sequence, which is generated in accordance with the forming principle $D_i = 1 + D_6 + D_7$. According to the CCITT recommendation, such a pseudorandom sequence can be produced by the type of shift register shown in FIG. 2.10. In the illustrated shift register, the outputs of the last two storage cells are linked to each other by an exclusive OR-gate, and the output of the exclusive OR-gate leads to the input of the first shift register. Here $D_i$ is the binary value at the input of the shift register, $D_6$ the binary value at the output of the next-to-last storage cell, and $D_7$ the binary value at the output of the last storage cell.

According to the CCITT recommendation G.709, a serial data stream to be transmitted must be scrambled in accordance with the above named forming principle.

It is now known to convert serial data streams into parallel partial streams for data streams with a high bit rate frequency, and to link the partial streams by modulo-2 addition in such a way, that a subsequently reconverted serial data stream is scrambled with the desired pseudorandom sequence. For several decades the required pseudorandom sequences for the modulo-2 addition of the partial streams have been produced by a feedback shift register with a downstream network. Improvements of parallel working scramblers were always sought by optimizing the downstream network.

It is known from PROC. IEE, Vol. 111, No. 11, November 1964, pages 1803 to 1806 by S. H. Tsao et al, to produce a pseudorandom sequence of finite length in a feedback shift register. A low depth shift register is used, in which further random sequences with a different phase relation are produced from directly acquired pseudorandom sequences through modulo-2 addition in a downstream network. The arrangement of the network allows the acquisition of more pseudorandom sequences than exist in the outputs of the shift registers. The network consists of exclusive OR-gates, in which the modulo-2 addition is performed. The network is optimized so that the lowest number of modulo-2 additions needs to be performed to produce a determined number of pseudorandom sequences with a different phase relation, to bring about as short a time delay as possible from the production of the additional pseudorandom sequences in the network.

In a report published ten years later by Siemens Research and Development, volume 3 (1974) no. 4, pages 218 to 224, the basic idea published by S. H. Tsao et al is used with the shift and addition properties—when two cyclically shifted versions of the same pseudorandom sequence with overlapping bits is modulo-2 added, the result is another cyclically shifted version of the same pseudorandom sequence. It was shown that the use of certain calculation principles permits one to simply and generally determine the required linkages for a definite predetermined structure of a pseudorandom sequence. The basic idea was pursued, that an N-stage shift register $L = 2^N - 1$ can produce similar pseudorandom sequences with a different phase relation.

scramblers are known from part 1 of a report published nine years later in Elektronik 26/30.12.1983, pages 67 to 70, entitled "Parallel working scrambler, descrambler and random sequence generators", in which the idea is still being pursued to create similar pseudorandom sequences, but which are phase shifted with respect to each other, from an N-stage shift register $L = 2^N - 1$.

Particularly suitable linkages for parallel working multiplicative scramblers are indicated.

The disadvantage of the known solutions lies in that modulo-2 additions performed in series in a network require a minimum cycle period, which limits the maximum bit rate frequency.

SUMMARY OF THE INVENTION

The invention has therefore the task of creating a parallel additive scrambler/descrambler for a high bit rate frequency.

The task is fulfilled by the characteristics of claims 1 and 9 or 10 and 11.

Advantageous configurations of the invention can be found in the remaining claims.

BRIEF DESCRIPTION OF THE DRAWINGS

Three configuration examples are described by means of FIGS. 1 to 4, where.

BEST MODE FOR CARRYING OUT THE INVENTION

Figure 1:
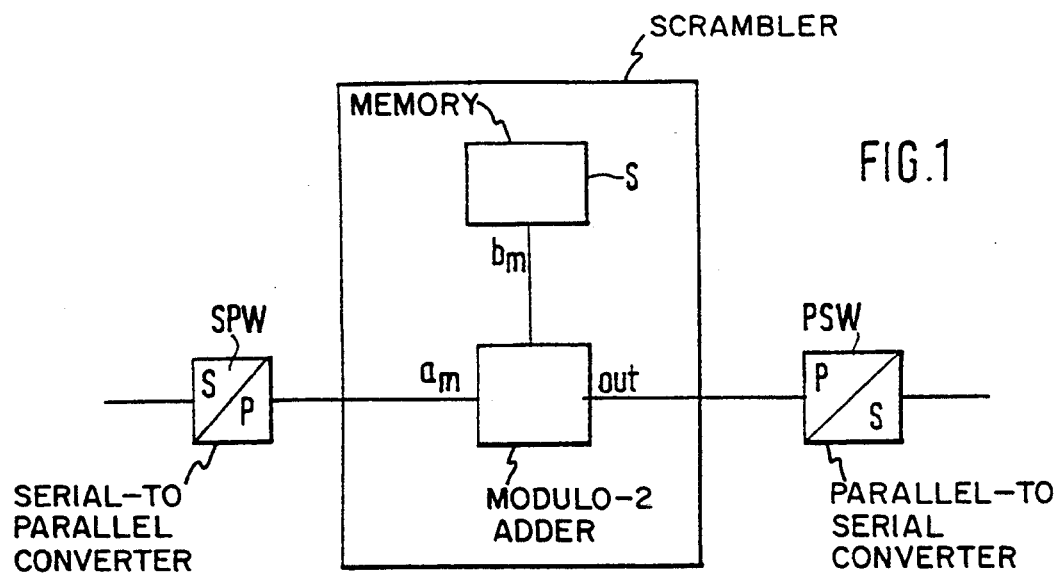
FIG. 1 is a block circuit diagram of a parallel additive scrambler.

FIG. 1 illustrates a block circuit diagram of a scrambler SCR according to the invention. The scrambler SCR contains a memory S, which fully stores the pseudorandom sequence used for scrambling. The memory S is linked to a device MOD for modulo-2 addition by an m bit wide connection. The device MOD for modulo-2 addition now scrambles a parallel converted data stream of m bit wide words. A serial-parallel converter SPW produces the parallel converted data stream from a serial data stream. After the modulo-2 addition, the scrambled parallel converted data stream is converted into a scrambled serial data stream by a multiplexer that is used as a parallel-serial converter PSW. The serial-parallel converter SPW and the parallel-serial converter PSW need not necessarily be components of the scrambler SCR. The scrambler can also be a component of a complex circuit arrangement, in which parallel data streams are processed word by word. It is significant in the invention that the parallelized data stream is modulo-2 added in such a way, that it is scrambled, after the parallel-serial conversion, with a pseudorandom sequence specified for the serial data stream.

Figure 2:
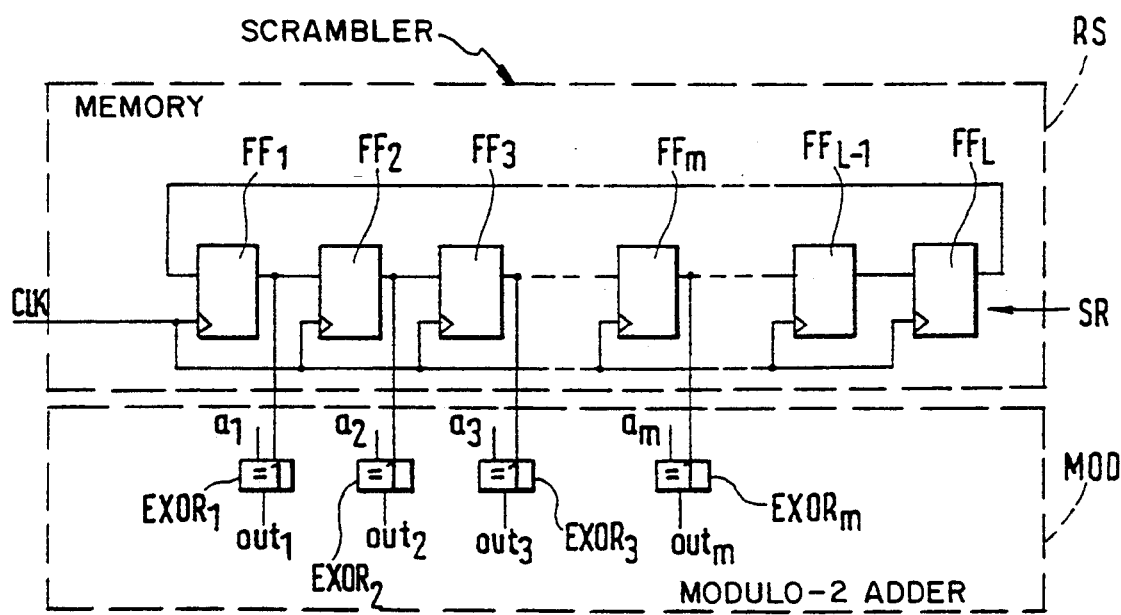
FIG. 2 is an example of a scrambler with a shift register whose depth L is larger than the width m scrambled.

FIG. 2 shows a configuration example of a scrambler SCR, which, as memory S, contains an L-stage, cycled, feedback shift register SR, which is connected to a device MOD for modulo-2 addition, consisting of m exclusive OR-gates $EXOR_1$ to $EXOR_m$. The shift register SR consists of an L-number of D-Flip-Flops, where the data output of the last D-Flip-Flop $FF_L$ is connected to the data input of the first D-Flip--Flop $FF_1$. It therefore represents the form of a circular storage. L is a positive integer and corresponds to the length of the pseudorandom sequence with which the serial data stream is to be scrambled. Each of the data outputs of D-Flip--Flop $FF_1$ to D-Flip-Flop $FF_m$ is connected to the first data input of one of the exclusive OR-gates $EXOR_1$ to $EXOR_m$. m is a positive integer and corresponds to the word width of the parallel converted data stream, or expressed otherwise, m corresponds to the number of partial streams into which the parallel converted serial data stream is divided. The m partial streams of the parallel converted data stream are located at the second inputs $a_1$ to $a_m$ of the exclusive OR-gates $EXOR_1$ to $EXOR_m$, where they are modulo-2 added word by word. The modulo-2 added partial streams are located at the outputs $out_1$ to $out_m$ of the exclusive OR-gates $EXOR_1$ to $EXOR_m$, which together form the parallel output 'out' of the device MOD for the modulo-2 addition.

The configuration example is provided for the case where the length L of the pseudorandom sequence being used is larger than the word width m of the parallel converted data stream. In an extreme case, m and L could be equal.

During an operational cycle period, each data word of an m width is modulo-2 added to one bit of an m bit wide pseudorandom sequence, where neighboring bits of the data words are linked to one respective bit of the pseudorandom sequence, which has been phase shifted by one bit. This shifts the pseudorandom sequence in the circular storage RS to the left by m bits, and during the next cycle period, the following data word is linked to the next m bits of the pseudorandom sequence with reference to the phase relation. This process is continuously repeated.

In the event that the word width m is larger than half the length L/2 of the pseudorandom sequence, the pseudorandom sequence in the circular storage RS is not shifted to the left by m bits, rather is shifted to the right by L-m bits, which leads to the same results after the shifting operation, but can be achieved with a shifting operation that is shorter by 2m-L shifting stages.

Figure 3:
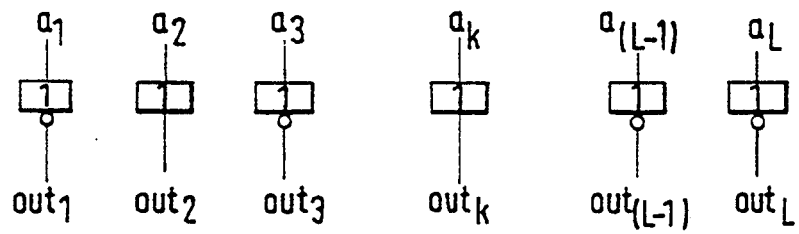
FIG. 3 is a configuration example of a scrambler with a shift register, whose depth L is equal to the width m of the word to be scrambled.

FIG. 3 depicts a particularly simple configuration example of a scrambler, where the word width m and the length L of the pseudorandom sequence are equal. This shifting operation can be omitted, since an m=L bit shifting operation of the pseudorandom sequence leads to the same phase relation as before the shifting operation. Those partial streams that are negated by the modulo-2 addition, are negated in an inverter (INV) in the configuration example of FIG. 3; those that should not be negated are passed through a pulse regenerator (PR). The desired pseudorandom sequence is determined by the selection and arrangement of the inverter or the pulse regenerator for each partial stream of the parallel converted data stream. The inverter and the pulse regenerator perform the desired conversion of the data stream, so that the selection and arrangement of the invertor and the pulse regenerator fulfill both the function of the memory S for storing the pseudorandom sequence, and the function of the device MOD for the modulo-2 addition. Instead of the pulse regenerator, any gate may be omitted for the purpose of scrambling.

Figure 4:
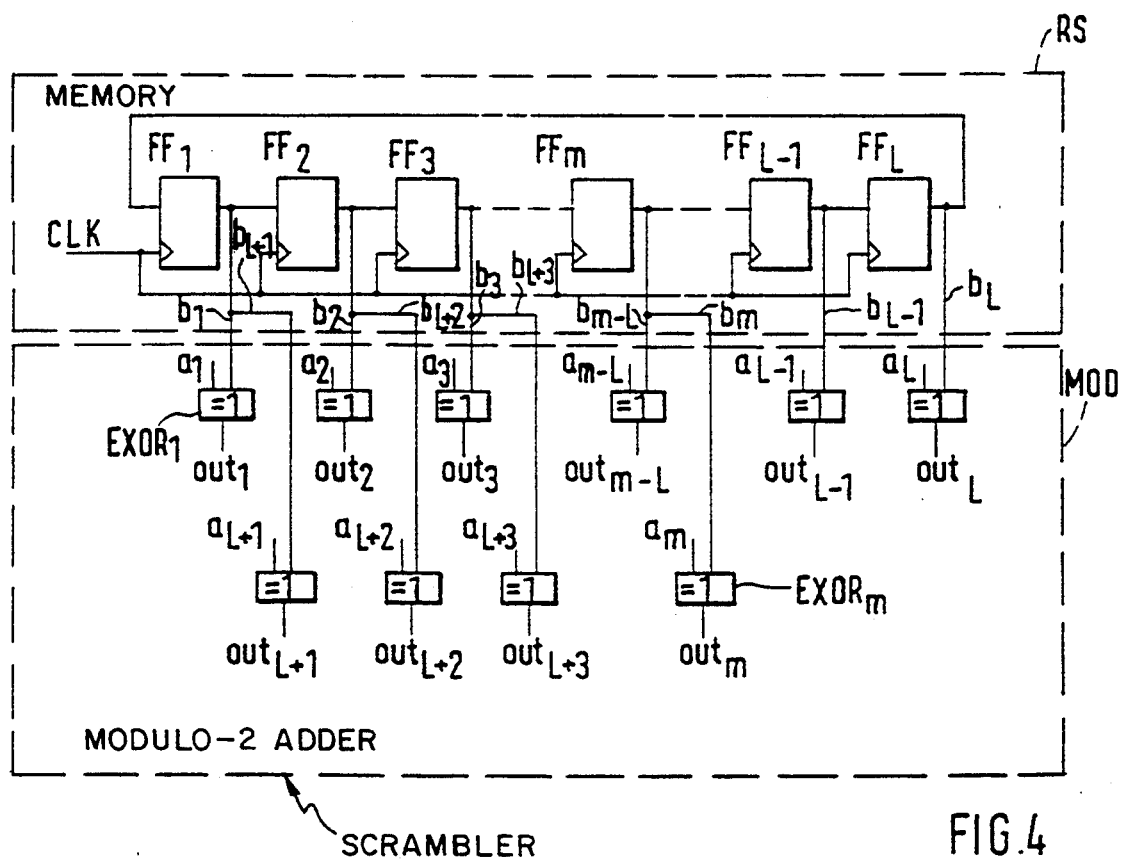
FIG. 4 is a configuration example of a scrambler with a shift register for a word to be scrambled, whose width m is larger than, but not more than double, the depth L of the shift register.

FIG. 4 represents a configuration example that starts with the one in FIG. 2, and is expanded for the case where the width m of a word to be scrambled is larger than the length L of the pseudorandom sequence being used. The configuration example concretely refers to a relationship between the word widths m and the length L of the pseudorandom sequence, where $L<m<2L$. As illustrated in FIG. 4, the circular storage RS in FIG. 2 shows 2 (m-L) outputs, e.g. $b_1$, $b_{L+1}$; $b_2$, $b_{L+2}$; $b_3$, $b_{L+3}$; $b_{m-L}$, $b_m$, in which the same bits of the pseudorandom sequence are located in pairs, so that the circular storage RS has a total of m outputs in which the total L bits of the pseudorandom sequence are located. These m outputs of the circular storage RS are respectively connected to an input of an m exclusive OR-gate $EXOR_I$ to $EXOR_m$, where the exclusive OR-gates $EXOR_1$ to $EXOR_m$ represent the device of the modulo-2 addition, at the second data outputs $a_1$ to $a_m$ of the exclusive OR-gates $EXOR_1$ to $EXOR_m$, and where they are modulo-2 added word by word with the pseudorandom sequence, as was also shown in the configuration example in FIG. 2.

The manner of operation basically coincides with that of the configuration example in FIG. 2, where the stored pseudorandom sequence in the annular storage RS is shifted to the left by m-L bits between successive modulo-2 additions of two successive data words. In the event the word width m is larger than one-and-a-half times the length L of the pseudorandom sequence, similar to the configuration example in FIG. 2, it is advantageous to shift the pseudorandom sequence to the right by 2×(L-m) bits.

In the event the word width m is larger than twice the length of the pseudorandom sequence, but smaller than three times the length of the pseudorandom sequence, similar to the configuration example in FIG. 4, the circular storage (not illustrated) has three (m-2L) outputs, where the same bits of the pseudorandom sequence are located in the respective three outputs. For even larger word widths m, when compared to the length L of the pseudorandom sequence, the circular storage RS must be expanded, similar to the above described configuration examples.

To scramble an STM-6 signal with a bit rate frequency of f=2.48832 Gbit/s, another configuration example uses a scrambler according to FIG. 4, in which the length L of the pseudorandom sequence consists of 127 bits in accordance with the CCITT recommendation G. 709 number 2.4, and the parallel converted data stream has a word width of m=128 bits. In that instance the data stream is divided into 128 partial streams, so that the scrambler processes data words that are 128 bits wide.

In that instance the circular storage RS has a shift register SR with 127-stages, in which the data output of the first Flip-Flop $FF_1$ is supplied to two outputs of the circular storage RS. After the modulo-2 addition of a data word, the pseudorandom sequence in the circular storage RS is shifted to the left by one bit. This is followed by the modulo-2 addition of the next data word.

The basic idea of the invention, to store entire pseudorandom sequences as described in the configuration examples with reference to the scrambler SCR, can also be realized in descramblers, in the same manner. In contrast to the scramblers, a scrambled data stream is supplied to the descramblers and processed in the same way as in the above mentioned configuration examples, which finally produces a descrambled data stream.

We claim:

1. A parallel additive scrambler for scrambling a serial data stream converted to parallel m-bit words, where m is a positive integer, comprising:
   a memory (S) for storing completely a pseudorandom sequence with a length of L bits, having m parallel outputs and having means for shifting the pseudorandom sequence to form a series of phase-shifted pseudorandom sequences; and
   a modulo-2 adder (MOD) connected to the m parallel outputs of the memory (S), having means for adding each parallel m-bit word with one of the series of the phase-shifted pseudorandom sequences for scrambling the serial data stream with a predetermined pseudorandom sequence.

2. A scrambler as claimed in claim 1, characterized in that the memory (S) is a circulating register (RS).

3. A scrambler as claimed in claim 2, characterized in that the pseudorandom sequence consists of L bits, and that the circulating register (RS) has L locations, where L is a positive integer.

4. A scrambler as claimed in claim 3, characterized in that the word length m is greater than the length L of the pseudorandom sequence, and that the same bits of a pseudorandom sequence appear in pairs m - L outputs of the memory (S).

5. A scrambler as claimed in claim 4, characterized in that the word length is m = 128 bits, that the pseudorandom sequence has a length of L = 127 bits, and that the first and the last bit of a word are scrambled with the same bit of a pseudorandom sequence.

6. A scrambler as claimed in claim 2, characterized in that the pseudorandom sequence is stored in a circulating register (RS) so as to be aligned in a first direction, that the word length m of the m-bit parallel words is greater than half a length L/2 of the pseudorandom sequence, and that the modulo 2 adder (MOD) has means for shifting the pseudorandom sequence in a second direction opposite to the first direction.

7. A scrambler as claimed in claim 2, characterized in that the word length m is greater than the length L of the pseudorandom sequence, and that the same bits of a pseudorandom sequence appear in pairs m - L outputs of the memory (S).

8. A scrambler as claimed in claim 2, characterized in that the circulating register (RS) is a feedback shift register (SR).

9. A scrambler as claimed in claim 8, characterized in that the pseudorandom sequence is stored in a circulating register (RS) so as to be aligned in a first direction, that the word length m of the m-bit parallel words is greater than half length L/2 of the pseudorandom sequence, and that the modulo 2 adder (MOD) has means for shifting the pseudorandom sequence in a second direction opposite to the first direction.

10. A scrambler as claimed in claim 8, characterized in that the word length m is greater than the length L of the pseudorandom sequence, and that the same bits of a pseudorandom sequence appear in pairs m - L outputs of the memory (S).

11. A scrambler as claimed in claim 8, characterized in that the pseudorandom sequence consists of L bits, and that the circulating register (RS) has L locations, where L is a positive integer.

12. A scrambler as claimed in claim 11, characterized in that the pseudorandom sequence is stored in a circulating register (RS) so as to be aligned in a first direction, that the word Length m of the m-bit parallel words is greater than half a Length L/2 of the pseudorandom sequence, and that the modulo 2 adder (MOD) has means for shifting the pseudorandom sequence in a second direction opposite to the first direction.

13. A scrambler as claimed in claim 11, characterized in that the word length m is greater than the length L of the pseudorandom sequence, and that the same bits of a pseudorandom sequence appear in pairs at m - L outputs of the memory (S).

14. A scrambler as claimed in claim 13, characterized in that the word length is m = 128 bits, that the pseudorandom sequence has a length of L = 127 bits, and that the first and the last bit of a word are scrambled with the same bit of a pseudorandom sequence.

15. A scrambler as claimed in claim 11, characterized in that the pseudorandom sequence is stored in a circulating register (RS) so as to be aligned in a first direction, that an integral multiple of the m-bit parallel words is greater than an integral multiple of a Length L of the pseudorandom sequence plus more than half the Length L/2 of the pseudorandom sequence, and that the modulo 2 adder (MOD) has means for shifting the pseudorandom sequence in a second direction opposite to the first direction.

16. A scrambler as claimed in claim 1, characterized in that the word length m is greater than the length L of the pseudorandom sequence, and that the same bits of a pseudorandom sequence appear in pairs m - L outputs of the memory (S).

17. A parallel additive scrambler for scrambling a serial data stream converted to parallel words with a length m, where m is a positive integer, comprising:
   a memory (S) having means for storing completely a pseudorandom sequence having a length of L bits which is equal to m; and
   a modulo-2 adder (MOD) connected to the m parallel outputs of the memory (S), having means for inverting one part of each parallel m-bit word, and having means for regenerating another part of each parallel m-bit word, for scrambling the serial data stream with a predetermined pseudorandom sequence.

18. A parallel additive descrambler for descrambling a serial data stream converted to parallel m-bit words, where m is a positive integer, comprising:
   a memory (S) for storing completely a pseudorandom sequence with a length of L bits, having m parallel outputs and having means for shifting the pseudorandom sequence to form a series of phase-shifted pseudorandom sequences; and
   a modulo-2 adder (MOD) connected to the m parallel outputs of the memory (S), having means for adding each parallel m-bit word with one of the series of the phase-shifted pseudorandom sequences for descrambling the serial data stream with a predetermined pseudorandom sequence.

19. A parallel additive descrambler for descrambling a serial data stream converted to parallel m-bit words, where m is a positive integer,
   a memory (S) having means for storing completely a pseudorandom sequence having a length of L bits which is equal to m; and
   a modulo-2 adder (MOD) connected to the m parallel outputs of the memory (S), having means for inverting one part of each parallel m-bit word, and having means for regenerating another part of each parallel m-bit word, for descrambling the serial data stream with a predetermined pseudorandom sequence.

* * * * *

UNITED STATES PATENT AND TRADEMARK OFFICE
CERTIFICATE OF CORRECTION

PATENT NO. : 5,377,265
DATED : December 27, 1994
INVENTOR(S) : Wettengel et al

It is certified that error appears in the above-indentified patent and that said Letters Patent is hereby corrected as shown below:

At column 5, line 55 (claim 9, line 5), please change "half length" to --half a length--.

Signed and Sealed this

Eighteenth Day of April, 1995

*Attest:*

BRUCE LEHMAN

*Attesting Officer*   *Commissioner of Patents and Trademarks*